United States Patent
Wang et al.

(10) Patent No.: US 11,960,333 B2
(45) Date of Patent: Apr. 16, 2024

(54) DISPLAY PANEL, METHOD FOR MANUFACTURING THE SAME AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Zhiqiang Wang, Beijing (CN); Bing Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 392 days.

(21) Appl. No.: 17/430,686

(22) PCT Filed: Jan. 7, 2021

(86) PCT No.: PCT/CN2021/070595
§ 371 (c)(1),
(2) Date: Aug. 12, 2021

(87) PCT Pub. No.: WO2021/169620
PCT Pub. Date: Sep. 2, 2021

(65) Prior Publication Data
US 2023/0152864 A1    May 18, 2023

(30) Foreign Application Priority Data

Feb. 24, 2020  (CN) .......................... 202010111984.6

(51) Int. Cl.
*G06F 1/16*    (2006.01)
(52) U.S. Cl.
CPC .......... *G06F 1/1683* (2013.01); *G06F 1/1616* (2013.01); *G06F 1/1652* (2013.01)

(58) Field of Classification Search
CPC .... G06F 1/1683; G06F 1/1616; G06F 1/1652; G06F 1/1637; G06F 1/1641; G09F 9/301
See application file for complete search history.

(56) References Cited

U.S. PATENT DOCUMENTS

2017/0162821 A1* 6/2017 Oh ........................ H10K 59/12
2017/0371376 A1* 12/2017 Chung .............. G02F 1/133305
(Continued)

FOREIGN PATENT DOCUMENTS

CN    102436151 A     5/2012
CN    106782088 A *   5/2017 ............. G09F 9/301
(Continued)

OTHER PUBLICATIONS

PCT/2021/070595 international search report and written opinion.

*Primary Examiner* — James Wu
*Assistant Examiner* — Christopher L Augustin
(74) *Attorney, Agent, or Firm* — IPro, PLLC

(57) ABSTRACT

A display panel, a method for manufacturing the display panel and a display device are provided. The display panel includes a display region and a bezel region, the display region includes at least one first bending region extending in a first direction, and the bezel region includes a second bending region extending in a second direction crossing the first direction. At least one position where an extension line of the at least one first bending region crosses an extension line of the second bending region forms at least one overlapping region, and the display panel further includes a hollowed-out structure formed in the at least one overlapping region and penetrating a display surface and a non-display surface of the display panel.

20 Claims, 5 Drawing Sheets

(56) References Cited

U.S. PATENT DOCUMENTS

| | | | |
|---|---|---|---|
| 2018/0068613 A1* | 3/2018 | Chung | G06F 3/147 |
| 2021/0013432 A1* | 1/2021 | Teng | H10K 59/13 |
| 2021/0209971 A1 | 7/2021 | Chu et al. | |
| 2021/0223823 A1* | 7/2021 | Chen | G06F 1/1652 |
| 2021/0367173 A1 | 11/2021 | Lee et al. | |

FOREIGN PATENT DOCUMENTS

| | | | | |
|---|---|---|---|---|
| CN | 106782088 A | 5/2017 | | |
| CN | 107799536 A | 3/2018 | | |
| CN | 109192078 A | 1/2019 | | |
| CN | 110286794 A | 9/2019 | | |
| CN | 110444678 A | 11/2019 | | |
| CN | 111292620 A | 6/2020 | | |
| CN | 112071195 A * | 12/2020 | | G09F 9/301 |
| JP | 5818583 B2 | 11/2015 | | |

\* cited by examiner

DISPLAY PANEL, METHOD FOR MANUFACTURING THE SAME AND DISPLAY DEVICE

CROSS-REFERENCE TO RELATED APPLICATIONS

The present application is the U.S. national phase of PCT Application No. PCT/CN2021/070595 filed on Jan. 7, 2021, which a priority to Chinese Patent Application No. 202010111984.6 filed in China on Feb. 24, 2020, both disclosures of which are incorporated herein by reference in their entireties.

TECHNICAL FIELD

The present disclosure relates to the technical field of display, in particular to a display panel, a method for manufacturing the display panel and a display device.

BACKGROUND

Along with the development of display technology, users have increasing high demands for a display effect of a display screen, and such technologies as full-screen, narrow-bezel and foldable have become development trends of a flexible display panel. Currently, pad bending is a best solution to achieve a display product with an extremely narrow lower bezel.

SUMMARY

A display panel is provided, including a display region and a bezel region surrounding the display region. The display region includes at least one first bending region extending in a first direction, and the bezel region includes a second bending region extending in a second direction crossing the first direction, at least one position where an extension line of the at least one first bending region crosses an extension line of the second bending region forms at least one overlapping region, and the display panel further includes a hollowed-out structure formed in the at least one overlapping region and penetrating a display surface and a non-display surface of the display panel.

Further, each hollowed-out structure includes a groove structure recessed in a direction from a first edge of the display panel to the overlapping region, the bezel region includes a lower bezel region, the second bending region is arranged at the lower bezel region, and the first edge is an edge toward the lower bezel region and extending in the second direction.

Further, each hollowed-out structure includes an opening structure penetrating the display surface and the non-display surface of the display panel.

Further, the bezel region includes: a fan-out region connected to the display region, and at least two bonding circuit regions connected to a side of the fan-out region away from the display region. The second bending region is arranged in the fan-out region, the fan-out region includes at least two fan-out sub-regions respectively corresponding to the at least two bonding circuit regions, and the hollowed-out structure is arranged between every two adjacent bonding circuit regions.

Further, the at least two bonding circuit regions are bent to the non-display surface of the display panel through the second bending region.

Further, a first curvature radius of a bending structure bent and formed by the display panel through the first bending region is R1, a second curvature radius of a bending structure bent and formed by the bezel region through the second bending region is R2, and a half of a side length or a radius of a circumscribed circle of an orthogonal projection of the opening structure in a direction perpendicular to a base substrate is greater than max(R1, R2).

Further, the display panel further includes a base substrate including a cutting protection region surrounding the hollowed-out structure, and no wire being arranged in the cutting protection region.

Further, a wire is arranged in the fan-out region, and a region between the wire and the hollowed-out structure forms the cutting protection region.

Further, the hollowed-out structure includes a linear edge, and a minimum spacing between the linear edge and the wire arranged in a fan-out sub-region closest to the linear edge is greater than or equal to 170 µm, and/or, the hollowed-out structure includes an arc-shaped edge, and a minimum spacing between the arc-shaped edge and the wire arranged in a fan-out sub-region closest to the arc-shaped edge is greater than or equal to 250 µm, and/or, the hollowed-out structure includes a corner-like edge, and a minimum spacing between an vertex on the corner-like edge and the wire arranged in a fan-out sub-region closest to the vertex is greater than or equal to 300 µm.

Further, the hollowed-out structure includes an upper edge toward the display region, the second bending region includes an upper boundary toward the display region, and the upper edge of the hollowed-out structure is located between a bending center line of the second bending region and the upper boundary of the second bending region.

Further, a first width of the second bending region in the first direction is a, a second width between the upper edge of the hollowed-out structure and the upper boundary of the second bending region in the first direction is h1, and a relationship between the second width h1 and the first width a meets: $0<h1\le a/3$.

Further, the display panel includes multiple first bending regions, multiple positions where extension lines of the multiple first bending regions cross the extension line of the second bending region form multiple overlapping regions respectively, and the hollowed-out structure is arranged in each overlapping region.

Further, the display panel further includes a back-surface protection film arranged on a side where the non-display surface is located, and a hollowed-out pattern corresponding to the hollowed-out structure and arranged at a position corresponding to the hollowed-out structure is arranged in the back-surface protection film.

A display device is further provided, including the above-mentioned display panel.

A method for manufacturing the above-mentioned display panel is further provided, including: forming at least one first bending region and a second bending region on the display panel; and forming a hollowed-out structure in at least one overlapping region formed in at least one position where an extension line of at least one first bending region crosses an extension line of the second bending region.

Further, the forming the hollowed-out structure in at least one overlapping region formed in at least one position where an extension line of at least one first bending region crosses the extension line of the second bending region includes: forming the hollowed-out structure through laser cutting.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before the detailed description on the display panel and the display device of the embodiments of the present disclosure, it is necessary to describe the related art as follows.

Figure 1:
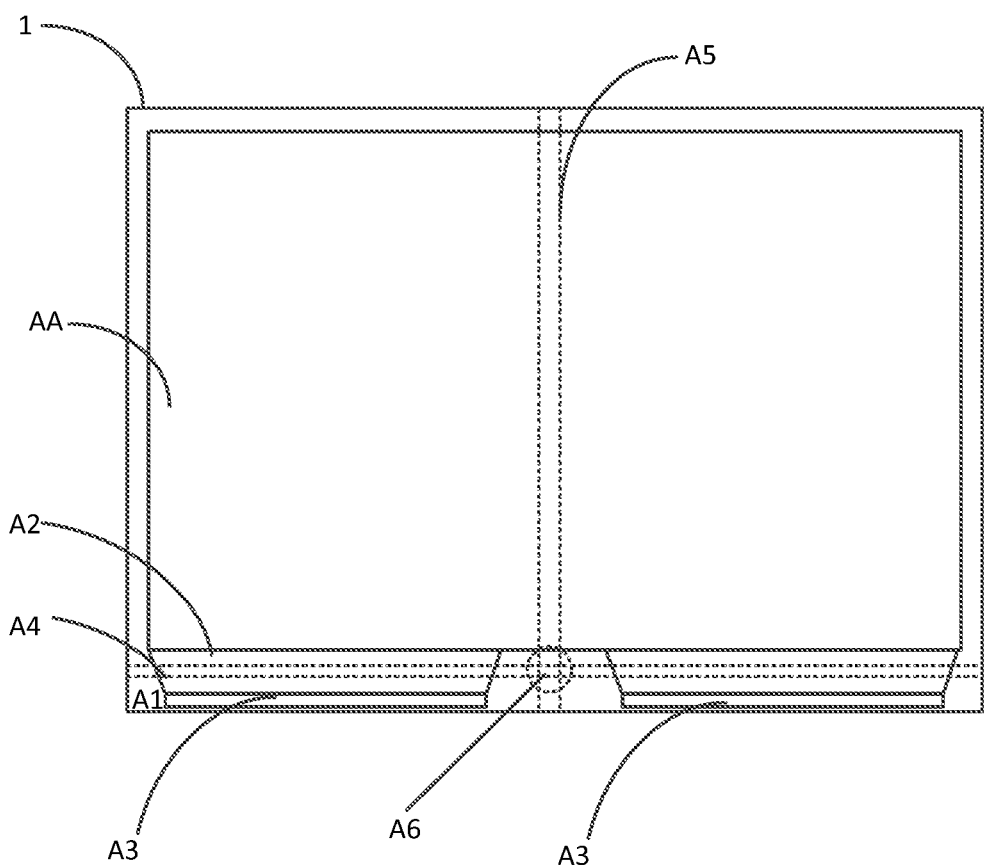
FIG. 1 is a structural view showing a flexible foldable display panel in the related art.

As shown in FIG. 1, in the related art, a flexible foldable display panel includes a display region AA and a bezel region surrounding the display region AA, and the display region AA includes a bending region for realizing foldable display of a display screen. The bezel region includes: a fan-out region A2, a bonding circuit region A3 and a bezel bending region A4, the fan-out region A2 is located at a lower end of the display region AA, and the bonding circuit region A3 is located at a lower end of the fan-out region A2 and configured to provide with a driving integrated chip (IC) chip and a bonding circuit.

In order to obtain a narrower lower bezel, a bending region (i.e., a pad bending region) is further provided in a lower bezel region, and the lower bezel region is bent towards a side of the flexible foldable display screen where a non-display surface is located through the bending region, so that the fan-out region and the bonding circuit region in the lower bezel region are located on the side where the non-display surface is located, thereby reducing the lower bezel of the flexible display screen.

Generally, in a medium-large-size and high-resolution flexible display panel (such as a laptop, a tablet computer and a vehicle-mounted display screen), there are at least two bonding circuit regions A3, and the bezel bending region A4, i.e., the pad bending region, is mainly arranged in the fan-out region A2 between the bonding circuit region A3 and the display region AA.

However, when an extension line of the bending region in the display screen crosses (for example, is perpendicular to) an extension line of the fan-out region, there is an overlapping region (also referred to as a bending overlapping region) between the bending region in the display region of the flexible foldable display screen and the bending region of the lower bezel region. The bending overlapping region is folded twice in a foldable display, so as to greatly increase the bending stress in the bending overlapping region in practical applications, increase the risk of breakage of a wire, and reduce the reliability of the flexible foldable display screen.

As shown in FIG. 1, the flexible foldable display panel includes a bending region A5 in the display region, and an extension line of the bending region A5 extends in a Y direction, and the bending region A5 is foldable inward/outward at both sides of a center of a screen. The bezel bending region is configured to bend towards the side of the flexible display screen where the non-display surface is located, so that the bonding circuit region is located at the side where the non-display surface is located, thereby to reduce the lower bezel of the flexible display screen. That is, the bonding circuit region A3 is bent to the back of the screen, so as to obtain a narrower lower bezel. There is an overlapping region (as shown in a dotted circle in FIG. 1) where the extension line of the bending region A5 crosses an extension line of the bezel bending region A4, and a bending overlapping region A6 is formed. The bending overlapping region A6 is folded twice in the foldable display, which will greatly increase the bending stress in the bending overlapping region A6 in practical applications, increase the risk of breaking the wire inside the bezel bending region A4, and reduce the reliability of the flexible foldable display screen.

In view of the above technical problem, a display panel and a display device are provided in the embodiments of the present disclosure, so as to reduce the bending stress in the overlapping region of the foldable display panel and improve the reliability of the display panel.

Figure 2:
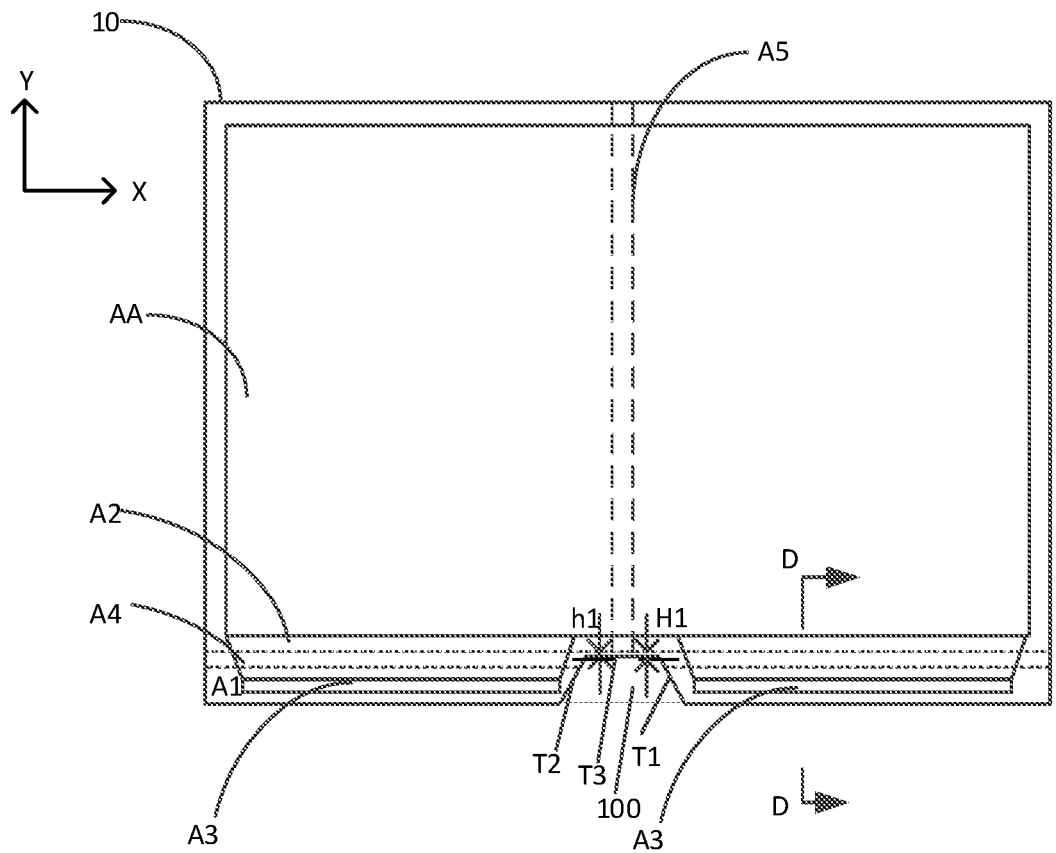
FIG. 2 is a front view of a display panel according to one embodiment of the present disclosure.

As shown in FIG. 2, a display panel is provided, including a display region AA and a bezel region surrounding the display region AA. The display region AA includes at least one first bending region A5 extending along a first direction Y, the bezel region includes a second bending region A4 extending in a second direction X crossing the first direction Y, at least one position where an extension line of the at least one first bending region A5 crosses an extension line of the second bending region A4 forms at least one overlapping region, and the display panel further includes a hollowed-out structure 100 formed in the at least one overlapping region and penetrating a display surface and a non-display surface of the display panel.

In the above-mentioned solution, the at least one overlapping region formed in the at least one position where the extension line of the at least one first bending region A5 crosses the extension line of the second bending region A4 is designed as the hollowed-out structure 100, so as to prevent the overlapping region from being folded twice or more, and reduce the bending stress in the overlapping region, thereby to improve the reliability of the display panel.

The display panel of the embodiments of the present disclosure is described in more details below.

In an illustrative embodiment, as shown in FIG. 2, each hollowed-out structure 100 includes a groove structure recessed in a direction from a first edge of the display panel to the overlapping region, the bezel region includes a lower bezel region, the second bending region is arranged at the lower bezel region, and the first edge is an edge toward the lower bezel region and extending in the second direction.

In the above-mentioned solution, the position where the extension line of the at least one first bending region A5 in the display region AA crosses the extension line of the second bending region A4 in the bezel region is cut, for example, through laser cutting, so as form the groove structure used as the hollowed-out structure 100. An orthogonal projection of the groove structure in a direction perpendicular to a base substrate may be trapezoidal-shaped, triangular-shaped, rectangular-shaped, ∩-shaped, semicircular-shaped, etc. As shown in FIG. 1, illustratively, the orthogonal projection of the groove structure in the direction perpendicular to the base substrate is trapezoidal-shaped. Considering the bending stress when the display panel is folded in practical applications, the groove structure is designed to be trapezoidal-shaped, so as to reduce the bending stress in the overlapping region in a better manner.

Figure 6:
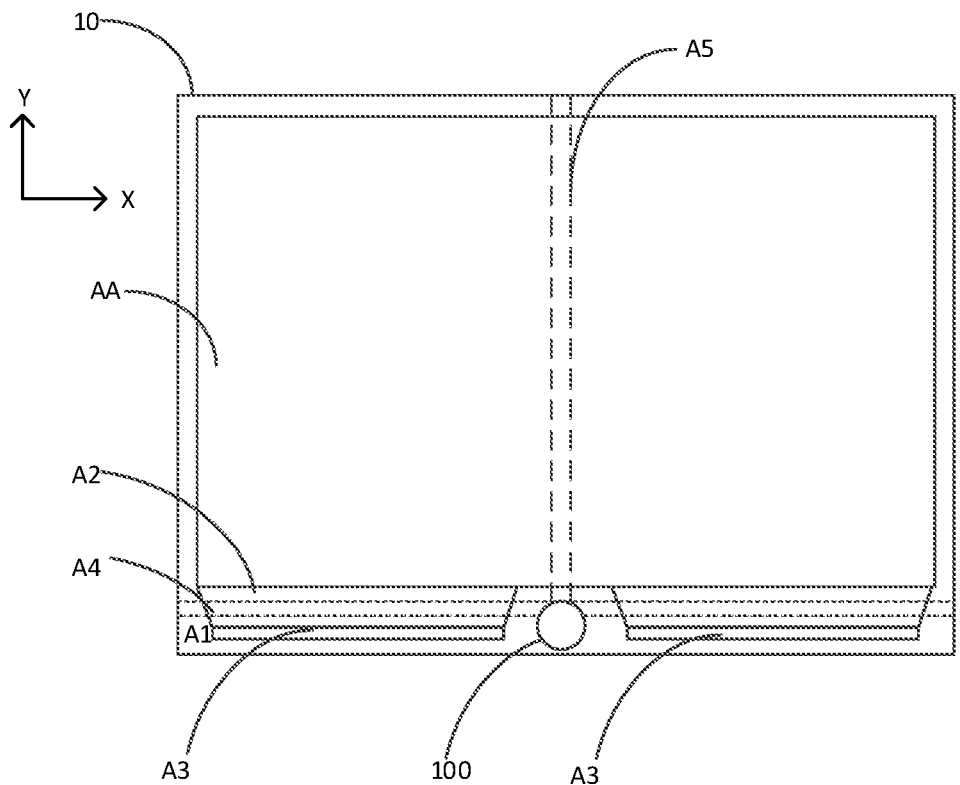
FIG. 6 is still yet another front view of the display panel according to one embodiment of the present disclosure.
Figure 7:
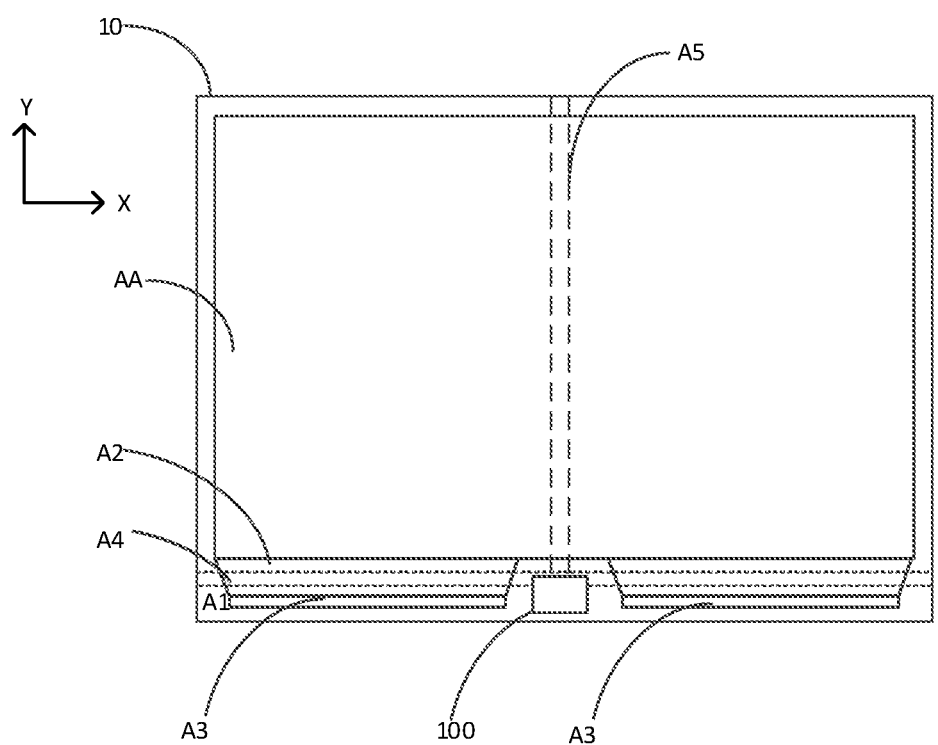
FIG. 7 is still yet another front view of the display panel according to one embodiment of the present disclosure.

In another illustrative embodiment, as shown in FIGS. 6 and 7, the hollowed-out structure 100 includes an opening structure penetrating the display surface and non-display surface of the display panel. That is to say, the hollowed-out structure 100 may also be formed in an opening manner, as shown in FIGS. 6 and 7, a specific shape of the opening structure is not limited, and the orthogonal projection of the opening structure in the direction perpendicular to the base substrate may be circular-shaped, square-shaped, trapezoidal-shaped, triangular-shaped, rectangular-shaped, or any special-shaped structure having a boundary which is formed by changing a boundary of above-mentioned shape into arc-shaped, etc.

In addition, it should be appreciated that a first curvature radius of a bending structure bent and formed by the display panel through the first bending region A5 is R1, a second curvature radius of a bending structure bent and formed by the bezel region through the second bending region A4 is R2, and a half of a side length or a radius of a circumscribed circle of an orthogonal projection of the opening structure in the direction perpendicular to the base substrate is greater than max(R1, R2).

For example, when the orthogonal projection of the opening structure in the direction perpendicular to the base substrate is circular-shaped, the circumscribed circle is a circle in orthogonal projection, and a radius of the opening structure is greater than max(R1, R2). When the orthogonal projection of the opening structure in the direction perpendicular to the base substrate is square-shaped, a half of a side length thereof is greater than max(R1, R2). When the orthogonal projection of the opening structure in the direction perpendicular to the base substrate is triangular-shaped, square-shaped, trapezoidal-shaped, etc. a radius of a circumscribed circle thereof is greater than max(R1, R2).

In some embodiments, the side length or the radius of the circumscribed circle of the orthogonal projection of the opening structure in the direction perpendicular to the base substrate may not be too large, and the following cutting protection region may be ensured to be sufficiently large, so as to reduce the adverse effects of debris and thermal effects during laser cutting on a metal wire.

In an exemplary embodiment, as shown in FIG. 2, the bezel region includes a lower bezel region A1, the second bending region A4 is located at the lower bezel region A1, the lower bezel region A1 includes: a fan-out region A2 connected to the display region AA, and at least two bonding circuit regions A3 connected to a side of the fan-out region A2 away from the display region AA The second bending region A4 is arranged in the fan-out region A2, the fan-out region includes at least two fan-out sub-regions respectively corresponding to the at least two bonding circuit regions A3, and the hollowed-out structure 100 is located between two adjacent bonding circuit regions A3.

The at least two bonding circuit regions are bent to the non-display surface of the display panel through the second bending region.

When the hollowed-out structure 100 is arranged between two adjacent bonding circuit regions A3, and the at least two bonding circuit regions may be bent to the non-display surface of the display panel separately, so as to improve the bending effect of each bonding circuit region.

In addition, a wire in the fan-out region A2 are arranged in such a manner as to avoid the hollowed-out structure 100, so as to prevent the wire from being adversely affected when the hollowed-out structure 100 is formed, for example, through laser cutting.

Further, in the embodiment, illustratively, as shown in FIG. 2, the display panel 10 includes a base substrate including a cutting protection region surrounding the hollowed-out structure 100, and no wire is arranged in the cutting protection region.

In the above-mentioned solution, the cutting protection region may be arranged on an edge side of the fan-out region in the bezel region toward the groove or opening structure, so as to reduce the adverse effects of the debris and thermal effects during laser cutting on the metal wire and improve the product yield.

In addition, the wire is arranged in the fan-out region A2, and a region between the wire and the hollowed-out structure 100 forms the cutting protection region. In the above-mentioned solution, when the wire is arranged, there is a certain spacing between the wire and a cutting line of the groove or opening structure, so as to further prevent the wire from being cut and damaged thereby to avoid the breakage of wire.

For the hollowed-out structure 100 of different shapes, optional value ranges of the spacing between the wire and the groove structure are provided below, so as to prevent the metal wire from being cut and damaged during laser cutting and avoid a heat-affected zone during laser cutting. When the hollowed-out structure 100 includes a linear edge, a minimum spacing between the linear edge and the wire arranged in the fan-out sub-region closest to the linear edge is greater than or equal to 170 μm. When the hollowed-out structure 100 includes an arc-shaped edge, a minimum spacing between the arc-shaped edge and the wire arranged in the fan-out sub-region closest to the arc-shaped edge is greater than or equal to 250 μm. When the hollowed-out structure 100 includes a corner-like edge, a minimum spacing between a vertex on the corner-like edge and the wire arranged in the fan-out sub-region closest to the vertex is greater than or equal to 300 μm.

For example, the orthogonal projection of the hollowed-out structure 100 in the direction perpendicular to the base substrate is trapezoidal-shaped as shown in FIG. 2, and the minimum spacing between an edge T1 of the trapezoid and the wire arranged in the fan-out sub-region closest to the edge T1 is greater than or equal to 170 μm.

When the hollowed-out structure 100 includes the arc-shaped edge, the minimum spacing between any point on the arc-shaped edge and the wire arranged in the fan-out sub-region closest to the point is greater than or equal to 250 µm.

In some embodiments, the corner-like edge is a structure formed through two edges of the hollowed-out structure crossing each other. For example, the orthogonal projection of the hollowed-out structure 100 in the direction perpendicular to the base substrate is trapezoidal-shaped shown in FIG. 2, and a structure formed through the edge T1 crossing an edge T3 of a trapezoid is the corner-like edge.

When the hollowed-out structure 100 includes the corner-like edge, the minimum spacing between the vertex on the corner-like edge and the wire arranged in the fan-out sub-region closest to the vertex is greater than or equal to 300 µm.

It should be appreciated that a spacing between the wire and the hollowed-out structure 100 may be rationally designed according to practical applications, and the above is merely an exemplary embodiment and it is not particularly defined herein.

Further, in the embodiment, illustratively, as shown in FIG. 2, the hollowed-out structure 100 includes an upper edge toward the display region AA, the second bending region A4 includes an upper boundary toward the display region AA; and the upper edge of the hollowed-out structure 100 is located between a bending center line of the second bending region A4 and the upper boundary of the second bending region A4.

Figure 3:
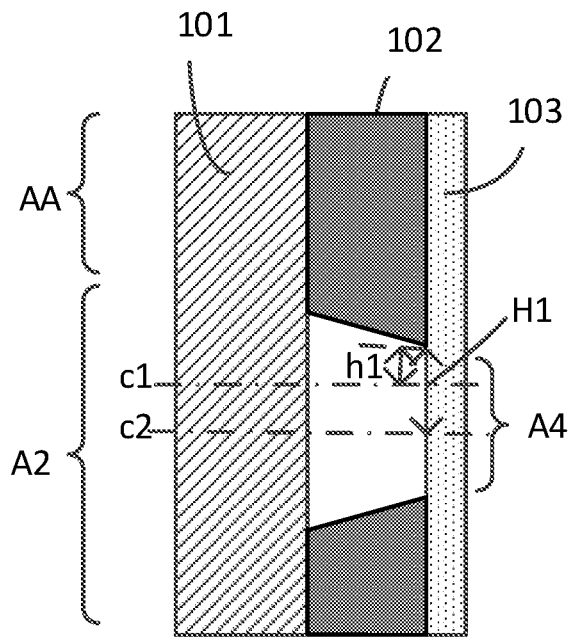
FIG. 3 is a cross-sectional view of the display panel in FIG. 2 along line D-D.

In the above-mentioned scheme, FIG. 3 is a schematic diagram of a cross-sectional lamination structure of the fan-out region. As shown in FIG. 3, the fan-out region A2 includes, from bottom to top, a metal layer (a metal wire, etc.), an organic protection layer 101, an inorganic layer 102 and a polyimide (PI) layer 103, the inorganic layer 102 above the PI layer 103 in the second bending region A4 is etched and removed through exposure to form a trenched structure, and the second bending region A4 (as shown in FIGS. 2 and 3) is formed by filling such an organic material as PI in the trenched structure, so as to mitigate and reduce the local stress in the second bending region A4 during bending. A laser cutting line c1 of the groove structure between two adjacent bonding circuit regions in the lower bezel region A1 in an X direction is in a region H1 above the center line c2 of the second bending region A4 (a PI filling region).

Specifically, a first width of the second bending region A4 in the first direction Y is a, a second width between the upper edge of the hollowed-out structure 100 and the upper boundary of the second bending region A4 in the first direction Y is h1, and a relationship between the second width h1 and the first width a meets: $0 < h1 \leq a/3$.

Further, in some embodiments, the display panel includes multiple first bending regions A5. Multiple positions where extension lines of the multiple first bending regions cross the extension line of the second bending region form multiple overlapping regions respectively, and the hollowed-out structure is arranged in each overlapping region.

Figure 4:
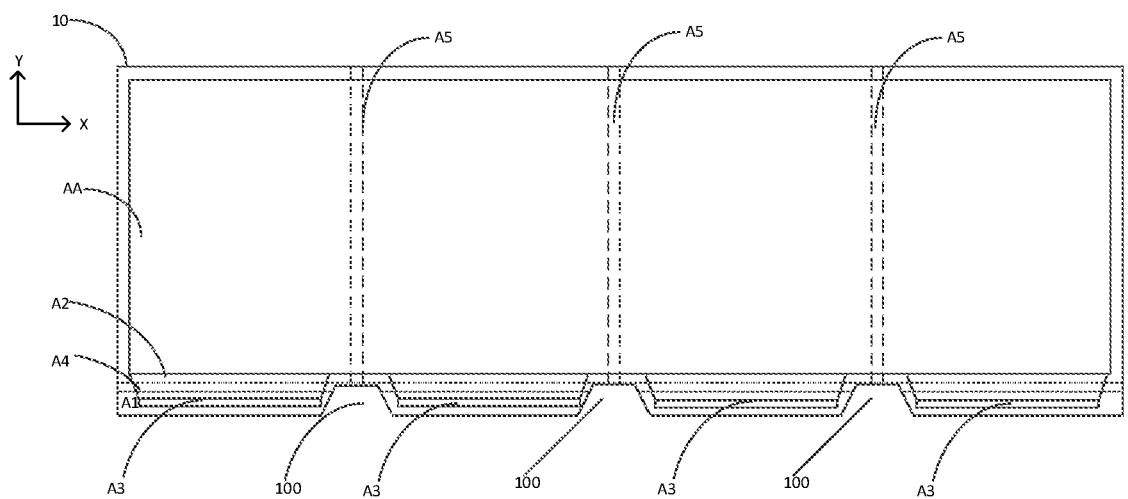
FIG. 4 is another front view of the display panel according to one embodiment of the present disclosure.
Figure 5:
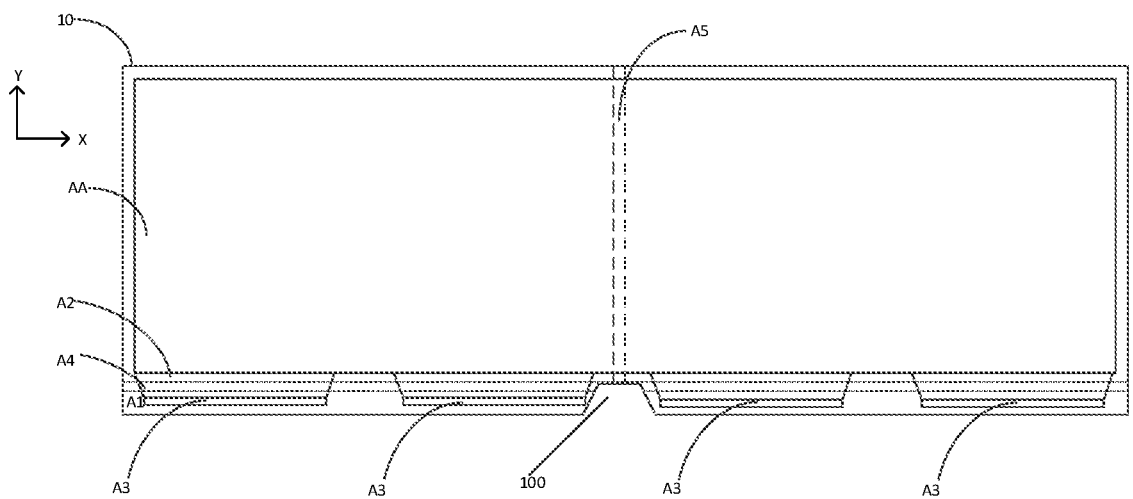
FIG. 5 is yet another front view of the display panel according to one embodiment of the present disclosure.

In the above-mentioned solution, for a foldable display panel having a larger size or a higher resolution and a narrow lower bezel, in a case where the first bending region A5 is formed at only a position between two adjacent bonding circuit regions A3 on both sides of the center line of the display panel respectively, then the groove structure or the opening structure is only formed between the two adjacent bonding circuit regions A3 on both sides of the center line of the display panel respectively through cutting, and the hollowed-out structure may not be arranged between other adjacent bonding circuit regions A3, as shown in FIG. 5. Alternatively, in a case where the first bending region A5 is formed between every two adjacent bonding circuit regions A3, the groove structure or the opening structure is formed between every two adjacent bonding circuit regions A3 through cutting, as shown in FIG. 4. For a display panel which needs to be bent more than once, for example, a Z-shaped flexible foldable display panel (as shown in FIG. 4), the groove structure or the opening structure may be formed between every two adjacent bonding circuit regions A3, so as to prevent the overlapping region of the display panel from being folded twice or more, thereby to improve the reliability of the display panel.

In addition, in an illustrative embodiment, the display panel further includes a back-surface protection film arranged on a side where the non-display surface is located, and a hollowed-out pattern, such as a protection film groove structure, corresponding to the hollowed-out structure 100 and arranged at a position corresponding to the hollowed-out structure 100 is arranged in the back-surface protection film. Optionally, an orthogonal projection of the protection film groove structure onto the flexible display screen is entirely within an orthogonal projection of the protection film onto the flexible display screen.

In the above-mentioned solution, the hollowed-out pattern is arranged in the back-surface protection film on the non-display surface of the display panel and arranged at the position corresponding to the hollowed-out structure 100, and a size of the hollowed-out pattern of the back-surface protection film is slightly less than or equal to a size of the hollowed-out structure 100 of the display panel, so as to prevent the back-surface protection film from being folded more than once in a region corresponding to the orthogonal projection of the overlapping region of the display panel.

In addition, a method for manufacturing the above-mentioned display panel is further provided in the embodiments of the present disclosure, including the following steps.

Step S1, forming at least one first bending region and a second bending region on the display panel.

Step S2, forming a hollowed-out structure in at least one overlapping region formed in at least one position where an extension line of at least one first bending region crosses an extension line of the second bending region.

Illustratively, the forming the hollowed-out structure in at least one overlapping region formed in at least one position where an extension line of at least one first bending region crosses the extension line of the second bending region includes: forming the hollowed-out structure through laser cutting.

It should be appreciated that, in practical applications, the hollowed-out structure may be formed in other manners and is not limited to through laser cutting.

In addition, a display device including the above-mentioned display panel is further provided in the embodiments of the present disclosure.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. A display panel, comprising a display region and a bezel region surrounding the display region, wherein the display region comprises at least one first bending region extending in a first direction, and the bezel region comprises a second bending region extending in a second direction crossing the first direction, at least one position where an extension line of the at least one first bending region crosses an extension line of the second bending region forms at least one overlapping region, and the display panel further comprises a hollowed-out structure formed in the at least one overlapping region and penetrating a display surface and a non-display surface of the display panel;
wherein the hollowed-out structure comprises an upper edge toward the display region, the second bending region comprises an upper boundary toward the display region, and the upper edge of the hollowed-out structure is located between a bending center line of the second bending region and the upper boundary of the second bending region.

2. The display panel according to claim 1, wherein each hollowed-out structure comprises a groove structure recessed in a direction from a first edge of the display panel to the overlapping region, the bezel region comprises a lower bezel region, the second bending region is arranged at the lower bezel region, and the first edge is an edge toward the lower bezel region and extending in the second direction.

3. The display panel according to claim 1, wherein each hollowed-out structure comprises an opening structure penetrating the display surface and the non-display surface of the display panel.

4. The display panel according to claim 2, wherein the bezel region comprises: a fan-out region connected to the display region, and at least two bonding circuit regions connected to a side of the fan-out region away from the display region,
wherein the second bending region is arranged in the fan-out region, the fan-out region comprises at least two fan-out sub-regions respectively corresponding to the at least two bonding circuit regions, and the hollowed-out structure is arranged between every two adjacent bonding circuit regions.

5. The display panel according to claim 4, wherein the at least two bonding circuit regions are bent to the non-display surface of the display panel through the second bending region.

6. The display panel according to claim 3, wherein a first curvature radius of a bending structure bent and formed by the display panel through the first bending region is R1, a second curvature radius of a bending structure bent and formed by the bezel region through the second bending region is R2, and a half of a side length or a radius of a circumscribed circle of an orthogonal projection of the opening structure in a direction perpendicular to a base substrate is greater than max(R1, R2).

7. The display panel according to claim 4, further comprising a base substrate comprising a cutting protection region surrounding the hollowed-out structure, and no wire being arranged in the cutting protection region.

8. The display panel according to claim 7, wherein a wire is arranged in the fan-out region, and a region between the wire and the hollowed-out structure forms the cutting protection region.

9. The display panel according to claim 8, wherein the hollowed-out structure comprises a linear edge, and a minimum spacing between the linear edge and the wire arranged in a fan-out sub-region closest to the linear edge is greater than or equal to 170 µm;
and/or the hollowed-out structure comprises an arc-shaped edge, and a minimum spacing between the arc-shaped edge and the wire arranged in a fan-out sub-region closest to the arc-shaped edge is greater than or equal to 250 µm;
and/or the hollowed-out structure comprises a corner-like edge, and a minimum spacing between a vertex on the corner-like edge and the wire arranged in a fan-out sub-region closest to the vertex is greater than or equal to 300 µm.

10. The display panel according to claim 1, wherein a first width of the second bending region in the first direction is a, a second width between the upper edge of the hollowed-out structure and the upper boundary of the second bending region in the first direction is h1, and a relationship between the second width h1 and the first width a meets:
$0 < h1 \leq a/3$.

11. The display panel according to claim 1, wherein the display panel comprises multiple first bending regions, multiple positions where extension lines of the multiple first bending regions cross the extension line of the second bending region form multiple overlapping regions respectively, and the hollowed-out structure is arranged in each overlapping region.

12. The display panel according to claim 1, further comprising a back-surface protection film arranged on a side where the non-display surface is located, wherein a hollowed-out pattern corresponding to the hollowed-out structure and arranged at a position corresponding to the hollowed-out structure is arranged in the back-surface protection film.

13. A display device, comprising the display panel of claim 1.

14. A method for manufacturing the display panel according to claim 1, comprising:
forming at least one first bending region and a second bending region on the display panel; and
forming a hollowed-out structure in at least one overlapping region formed in at least one position where an extension line of at least one first bending region crosses an extension line of the second bending region.

15. The method according to claim 14, wherein the forming the hollowed-out structure in at least one overlapping region formed in at least one position where an extension line of at least one first bending region crosses the extension line of the second bending region comprises:
forming the hollowed-out structure through laser cutting.

16. The display device according to claim 13, wherein each hollowed-out structure comprises a groove structure recessed in a direction from a first edge of the display panel to the overlapping region, the bezel region comprises a lower bezel region, the second bending region is arranged at the lower bezel region, and the first edge is an edge toward the lower bezel region and extending in the second direction.

17. The display device according to claim 13, wherein each hollowed-out structure comprises an opening structure penetrating the display surface and the non-display surface of the display panel.

18. The display device according to claim 16, wherein the bezel region comprises: a fan-out region connected to the display region, and at least two bonding circuit regions connected to a side of the fan-out region away from the display region, wherein the second bending region is arranged in the fan-out region, the fan-out region comprises at least two fan-out sub-regions respectively corresponding to the at least two bonding circuit regions, and the hollowed-out structure is arranged between every two adjacent bonding circuit regions.

19. The display device according to claim 18, wherein the at least two bonding circuit regions are bent to the non-display surface of the display panel through the second bending region.

20. The display device according to claim 13, wherein a first width of the second bending region in the first direction is a, a second width between the upper edge of the hollowed-out structure and the upper boundary of the second bending region in the first direction is $h1$, and a relationship between the second width $h1$ and the first width a meets: $0 < h1 \leq a/3$.

* * * * *